United States Patent
Sudo

[11] Patent Number: 6,038,502
[45] Date of Patent: Mar. 14, 2000

[54] APPARATUS AND METHOD FOR FLEET CONTROL WHEN UNMANNED AND MANNED VEHICLES TRAVEL TOGETHER

[75] Inventor: Tsugio Sudo, Tokyo, Japan

[73] Assignee: Komatsu Ltd., Tokyo, Japan

[21] Appl. No.: 09/125,488

[22] PCT Filed: Feb. 19, 1997

[86] PCT No.: PCT/JP97/00447

§ 371 Date: Aug. 19, 1998

§ 102(e) Date: Aug. 19, 1998

[87] PCT Pub. No.: WO97/31352

PCT Pub. Date: Aug. 28, 1997

[30] Foreign Application Priority Data

Feb. 21, 1996 [JP] Japan ................................. 8-058581

[51] Int. Cl.[7] .................................................. G06F 15/00
[52] U.S. Cl. .............................. 701/23; 701/24; 701/25; 701/117; 701/118; 701/119; 701/300; 701/301; 180/167; 180/168; 180/169; 180/170
[58] Field of Search .................................. 701/23, 24, 25, 701/117, 118, 300, 301, 200; 244/158 R, 159, 161, 162; 180/167–168, 169, 170

[56] References Cited

U.S. PATENT DOCUMENTS 4,653,002 3/1987 Barry ........................................ 701/23
5,170,351 12/1992 Nemoto et al. ........................... 701/23

FOREIGN PATENT DOCUMENTS

| 63-150709 | 6/1988 | Japan . |
| 63-150710 | 6/1988 | Japan . |
| 3-276309 | 12/1991 | Japan . |
| 4-304600 | 10/1992 | Japan . |
| 5-143158 | 6/1993 | Japan . |
| 8-84375 | 3/1996 | Japan . |

*Primary Examiner*—William A. Cuchlinski, Jr.
*Assistant Examiner*—Yonel Beaulieu
*Attorney, Agent, or Firm*—Sidley & Austin

[57] ABSTRACT

An apparatus and a method for fleet control when manned and unmanned vehicles travel together, and prevents mutual interference when manned vehicles simultaneously travel with unmanned vehicles on the same traveling course. To this end, in the apparatus, the unmanned vehicle includes an unmanned vehicle position detecting device, an unmanned vehicle transmitter/receiver, and an unmanned vehicle controller. The manned vehicle includes a manned vehicle position detecting device, a manned vehicle transmitter/receiver, a manned vehicle controller), and an alarm device. The manned vehicle controller compares unmanned vehicle position data and manned vehicle position data, and outputs an alarm signal for avoiding the unmanned vehicle when the unmanned vehicle travels ahead of the manned vehicle and the distance up to the unmanned vehicle is shorter than a predetermined value.

18 Claims, 5 Drawing Sheets

MONITORING STATION SIDE

APPARATUS AND METHOD FOR FLEET CONTROL WHEN UNMANNED AND MANNED VEHICLES TRAVEL TOGETHER

TECHNICAL FIELD

The present invention relates to an apparatus and a method for fleet control when unmanned and manned vehicles travel together, which simultaneously operates unmanned and manned vehicles on the same traveling course.

BACKGROUND ART

Conventionally, in a wide range of locations such as a quarry or the like, an unmanned dump truck operation system for transporting earth and sand by an unmanned vehicle such as an unmanned dump truck or the like, is widely adopted. The examples of the aforementioned unmanned vehicle operation system are, for example, as described below. Teaching of a traveling course to an unmanned vehicle is previously conducted by a specified method, and the coordinates data at each predetermined distance on the traveling course, or at each predetermined time are stored in a storage device. At the time of automatic traveling, the unmanned vehicle computes the deviation between the actual traveling position and the aforementioned traveling course data previously stored is computed. The unmanned vehicle controls steering, vehicle speed, starting and stopping, or the like, to decrease the deviation, and travels along the aforesaid traveling course.

In an unmanned vehicle operation system in a quarry described above, normally, a plurality of unmanned vehicles simultaneously travel along the same traveling course in order to secure a predetermined working amount (amount of transportation of earth and sand). In order to prevent a collision between the unmanned vehicles, or in order to operate the unmanned vehicle system efficiently, so-called fleet control, such as the control of start, traveling speed, stop, operating on another path, etc., is conducted for each of the unmanned vehicles.

In a site where the aforesaid fleet control is conducted, in most cases, manned vehicles driven by operators are operating in addition to unmanned vehicles. As a manned vehicle, there are, for example, a grader for repairing a travel road, a road-sprinkler, a service car which is used for repairing an unmanned vehicle with a problem or for performing maintenance, and the like. When a predetermined working amount is not secured only by the amount of transportation of earth and sand by unmanned vehicles, earth and sand is sometimes carried by manned vehicles such as dump trucks or the like, which are driven by operators. Few quarries are provided with a road which is designed specifically for these manned vehicles to travel, and generally, manned and unmanned vehicles are designed to simultaneously travel on the same traveling course. When earth and sand are carried by manned dump trucks or the like, even if a face site (a loading site) different from that for unmanned vehicles is used, an earth discharging site is commonly used in most cases. Therefore in some courses, unmanned vehicles and manned vehicles have to travel together in the area in the vicinity of earth discharging site. Accordingly, when unmanned vehicles and manned vehicles travel together as in the above, it is necessary to prevent collision and interference (near miss) between an unmanned vehicle and a manned vehicle, as well as between unmanned vehicles.

However, in the conventional fleet control, automatic control regarding unmanned vehicles is mainly conducted, therefore there is the risk of collision and interference when unmanned and manned vehicles travel together. For this reason, the unmanned vehicle is provided with an obstacle detecting means for detecting obstacles ahead thereof in the traveling direction, and thereby detecting a manned vehicle as an obstacle, and making an emergency stop in many cases. For this reason, the frequency of stopping the unmanned vehicles, which is not scheduled, is increased, therefore the availability of the unmanned vehicles is decreased, and there is a disadvantage that the operation efficiency of the entire system is decreased. In addition, the operators of the manned vehicles have to drive to maintain a predetermined distance between vehicles while always considering the position of the unmanned vehicles traveling ahead of and behind them on the traveling course, therefore, the load on the operators increases. Accordingly, there is a disadvantage of great tiredness of the drivers, which impairs the operation efficiency.

SUMMARY OF THE INVENTION

The present invention is made to eliminate the above disadvantages of the conventional art, and its object is to provide an apparatus and a method for fleet control when unmanned and manned vehicles travel together, by which mutual interference can be prevented when manned vehicles travel simultaneously with unmanned vehicles on the same traveling course.

A first aspect of an apparatus for fleet control when unmanned and manned vehicles travel together according to the present invention is an apparatus which controls and operates unmanned and manned vehicles simultaneously traveling on a same traveling course, and is characterized in that the unmanned vehicle includes an unmanned vehicle position detecting means for detecting its own position, an unmanned vehicle transmitter/receiver for transmitting and receiving data to and from the manned vehicles, and an unmanned vehicle controller for transmitting the detected unmanned vehicle position data by means of the unmanned vehicle transmitter/receiver, and the manned vehicle includes a manned vehicle position detecting means for detecting its own position, a manned vehicle transmitter/receiver for transmitting and receiving data to and from the unmanned vehicles, a manned vehicle controller for inputting the detected manned vehicle position data, and an alarm means for giving an alarm to an operator of the manned vehicle, so that the manned vehicle controller compares the unmanned vehicle position data which are inputted by means of the manned vehicle transmitter/receiver with the manned vehicle position data, and outputs an alarm signal to the alarm means for avoiding the unmanned vehicle when the unmanned vehicle travels ahead of the manned vehicle and the distance up to the unmanned vehicle is shorter than a predetermined value.

According to the above configuration, when the unmanned and manned vehicles travel together, the vehicles transmit and receive their positions to and from one another. When the unmanned vehicle travels ahead of the manned vehicle and the distance between both vehicles is shorter than a predetermined value, an alarm is given to the operator of the manned vehicle to perform an operation such as operating on another path, decelerating, stopping, or the like, to avoid the unmanned vehicle. Thereby the operator of the manned vehicle can perform a driving operation in accordance with the alarm, therefore the load during operation is reduced, and safety in traveling is increased.

A second aspect of the apparatus for fleet control when unmanned and manned vehicles travel together according to the present invention is an apparatus for fleet control which controls and operates unmanned and manned vehicles simultaneously traveling on a same traveling course, and is characterized in that the manned vehicle includes a manned vehicle position detecting means for detecting its own position, a manned vehicle transmitter/receiver for transmitting and receiving data to and from the unmanned vehicles, and a manned vehicle controller for transmitting the detected manned vehicle position data by means of the manned vehicle transmitter/receiver, and the unmanned vehicle includes an unmanned vehicle position detecting means for detecting its own position, an unmanned vehicle transmitter/receiver for transmitting and receiving data to and from the manned vehicles, an unmanned vehicle controller for inputting the detected unmanned vehicle position data, and a speed control means for conducting speed control of the unmanned vehicle by conducting at least one of the following controls: engine fuel injection quantity control, transmission control, and brake control, so that the unmanned vehicle controller compares the manned vehicle position data which are inputted by means of the unmanned vehicle transmitter/receiver with the unmanned vehicle position data, and outputs an executive instruction of the speed control to the speed control means when the manned vehicle travels ahead of the unmanned vehicle and the distance up to the manned vehicle is shorter than a predetermined value.

According to the configuration, as in the above description, the vehicles transmit and receive their positions to and from one another. When the manned vehicle travels ahead of the unmanned vehicle and the distance between both vehicles is shorter than a predetermined value, the speed of the unmanned vehicle is controlled by conducting engine fuel injection quantity control or the like, and the distance between the vehicles is maintained to be constant. Thereby the unmanned vehicles are prevented from mistakenly judging the manned vehicles as obstacles and making an emergency stop, therefore availability and safety in traveling are increased.

A third aspect of the apparatus for fleet control when unmanned and manned vehicles travel together according to the present invention is an apparatus for fleet control which includes a monitoring station, and which controls and operates unmanned and manned vehicles simultaneously traveling on a same traveling course, and is characterized in that the manned vehicle includes a manned vehicle position detecting means for detecting its own position, a manned vehicle transmitter/receiver for transmitting and receiving data and instructions to and from the monitoring station, a manned vehicle controller for transmitting the detected manned vehicle position data and inputting alarm instructions from the monitoring station by means of the manned vehicle transmitter/receiver, and an alarm means for giving an alarm to an operator based on the alarm instruction inputted from manned vehicle controller. The third aspect of the present invention is characterized in that the unmanned vehicle includes an unmanned vehicle position detecting means for detecting its own position, an unmanned vehicle transmitter/receiver for transmitting and receiving data instructions to and from the monitoring station, an unmanned vehicle controller for transmitting the detected unmanned vehicle position data and outputting a speed control instruction based on a deceleration instruction from monitoring station by means of the unmanned vehicle transmitter/receiver, and a speed control means for conducting speed control of the unmanned vehicle by conducting at least any one of the following controls: engine fuel injection quantity control, transmission control, and brake control based on the speed control instruction from the unmanned vehicle controller. The third aspect of the present invention is further characterized in that the monitoring station includes a monitoring station side transmitter/receiver for transmitting and receiving data and instructions to and from the manned and the unmanned vehicles, and a monitor controller, so that the monitor controller compares the respective position data of the manned and the unmanned vehicles which are received by means of the monitoring station side transmitter/receiver, transmits an alarm instruction to the manned vehicle to avoid the unmanned vehicle by means of the monitoring station side transmitter/receiver when the unmanned vehicle travels ahead of the manned vehicle and the distance between both vehicles is shorter than a predetermined value, and conducts at least one of the following: transmitting a speed control instruction to the unmanned vehicle by means of the monitoring station side transmitter/receiver, or transmitting an alarm instruction to the manned vehicle to avoid the unmanned vehicle by means of the monitoring station side transmitter/receiver when the manned vehicle travels ahead of the unmanned vehicle and the distance between both vehicles is shorter than a predetermined value.

According to the above configuration, when the unmanned and manned vehicles travel together, the respective positions are transmitted to and received from the monitoring station, and fleet control of the vehicles is conducted in the monitoring station side. Specifically, when the unmanned vehicle travels ahead of the manned vehicle and the distance between both vehicles is shorter than a predetermined value, an alarm instruction is transmitted to the manned vehicle from the monitoring station, and gives an alarm to the operator to perform an operation to avoid the manned vehicle. On the other hand, when the manned vehicle travels ahead of the unmanned vehicle and the distance between both vehicles is shorter than a predetermined value, one of the following is conducted: transmitting the speed control instruction to the unmanned vehicle from the monitoring station, or transmitting the alarm instruction to avoid the unmanned vehicle to the manned vehicle from the monitoring station. At this time, the unmanned vehicle controller controls the unmanned vehicle speed by controlling the engine fuel injection quantity or the like, based on the speed control instruction. Further, the operator of the manned vehicle conducts an operation such as operating on another path, decelerating, stopping, or the like. Thereby the operator of the manned vehicle can perform a driving operation while only paying attention to the interference with the unmanned vehicle ahead thereof in accordance with the alarm, therefore the load during operation is reduced and safety in traveling is increased. In addition, the unmanned vehicle can maintain the distance up to the manned vehicle ahead thereof to be constant, therefore availability and safety in traveling are increased as in the above.

A method for fleet control when unmanned and manned vehicles travel together according to the present invention is a method which controls and operates the manned and unmanned vehicles simultaneously traveling on a same traveling course, and is characterized by including the steps of comparing the position of the unmanned vehicle with the position of the manned vehicle, giving an alarm for avoiding the unmanned vehicle to an operator of the manned vehicle when the unmanned vehicle travels ahead of the manned vehicle and the distance between both vehicles is shorter than a predetermined value, and conducting at least either one of the following: conducting speed control of the unmanned vehicle by conducting at least any one of engine fuel injection quantity control, transmission control, and brake control, or giving an alarm for avoiding the unmanned vehicle to the operator of the manned vehicle when the manned vehicle travels ahead of the unmanned vehicle and the distance between both vehicles is shorter than a predetermined value.

According to the above configuration, when the unmanned and manned vehicles travel together, the speeds of both vehicles are controlled so as to maintain the distance between both vehicles to be longer than a predetermined value. Specifically, when the unmanned vehicle travels ahead of the manned vehicle and the distance between both vehicles is shorter than a predetermined value, an alarm is given to the operator of the manned vehicle to perform an operation to avoid the unmanned vehicle, such as operating on another path, decelerating, stopping, or the like. When the manned vehicle travels ahead of the unmanned vehicle and the distance between both vehicles is shorter than a predetermined value, the speed of the unmanned vehicle is controlled by controlling engine fuel injection quantity, or the like, so as to maintain the distance up to the manned vehicle ahead of the unmanned vehicle to be constant, or an alarm is given to the operator to perform an operation to avoid the unmanned vehicle. Thereby, as described in the above, the operation load on the operator is reduced, and availability and safety in traveling are increased.

DETAILED DESCRIPTION OF THE INVENTION

Preferred embodiments of the present invention will be described in detail with reference to the attached drawings.

Figure 1:
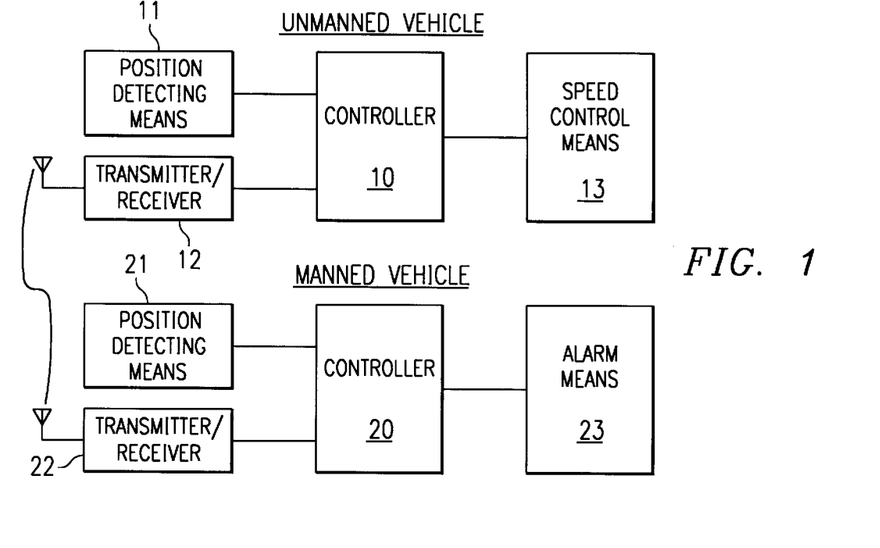
FIG. 1 is a block diagram of the configuration of a first embodiment of an apparatus for fleet control according to the present invention.

Referrring to FIG. 1 which is a block diagram of the configuration of a first embodiment, an unmanned vehicle is provided with an unmanned vehicle controller 10, an unmanned vehicle position detecting means 11, an unmanned vehicle transmitter/receiver 12, and a speed control means 13. The unmanned vehicle controller 10 controls the unmanned vehicle's operation so as to maintain the distance from the manned vehicle near the unmanned vehicle to be more than a predetermined value, and consists of an ordinary computer system mainly composed of, for example, a microcomputer. The unmanned vehicle position detecting means 11 detects the present position of the unmanned vehicle, and outputs the position data to the unmanned vehicle controller 10. The position data is detected as the coordinates in a travel coordinate system showing the entire traveling road of the unmanned vehicle by the unmanned vehicle position detecting means 11, and such a position detecting means is composed of the means in the below. For example, there is a means for detecting an absolute coordinate position by means of a GPS system or the like. Alternatively, there are means for obtaining a relative coordinate position from a known reference position by computation based on the traveled distance data which is detected from the traveling direction data (angle data) detected by gyro or the like, and the rotational frequency of a wheel or the like, etc.

The unmanned vehicle transmitter/receiver 12 transmits and receives data to and from the unmanned vehicle and the manned vehicle. Specifically, the unmanned vehicle transmitter/receiver 12 inputs the position data of the unmanned vehicle from the unmanned vehicle controller 10 and transmits the same to the manned vehicle, and receives the position data of the manned vehicle from the manned vehicle and outputs the same to the unmanned vehicle controller 10. The speed control means 13 controls the vehicle speed by controlling the engine speed, brake, or the like, based on a speed instruction from the unmanned vehicle controller 10. The speed control means 13 compares the aforesaid speed instruction signal with the vehicle speed signal from a vehicle speed detecting means which is not illustrated, and conducts at least one of the following controls: engine fuel injection quantity control, transmission control, and brake operation control to thereby equalize the vehicle speed to the aforesaid speed instruction.

The manned vehicle is provided with a manned vehicle controller 20, a manned vehicle position detecting means 21, a manned vehicle transmitter/receiver 22, and an alarm means 23. The manned vehicle controller 20 instructs an operator to maintain the distance from the unmanned vehicle near the manned vehicle to more than a predetermined value, and consists of an ordinary computer system mainly composed of, for example, a micro-computer. The manned vehicle position detecting means 21 detects the present position of the manned vehicle and outputs the position data to the manned vehicle controller 20, and the position data is detected as coordinates in the same traveling coordinate system as the unmanned vehicle. The manned vehicle position detecting means 21 is composed similarly to the aforesaid unmanned vehicle position detecting means 11.

The manned vehicle transmitter/receiver 22 transmits and receives data to and from the manned vehicle and the unmanned vehicle. Specifically, the manned vehicle transmitter/receiver 22 inputs the position data of the manned vehicle from the manned vehicle controller 20 and transmits the same to the unmanned vehicle, and receives the position data of the unmanned vehicle from the same vehicle and outputs the data to the manned vehicle controller 20. The alarm means 23 gives an alarm to the operator based on the alarm instruction signal from the manned vehicle controller 20 so that the operator operates the vehicle on another path, decreases the speed, stops the vehicle, or the like. The alarm means 23 gives an alarm by using any one of the following: an indicator lamp such as, for example, a warning light, prompting message display on a character display device (a segment display or the like) and a graphic display (a CRT, a liquid crystal display, or the like), and an alarm, such as a buzzer.

Figure 2:
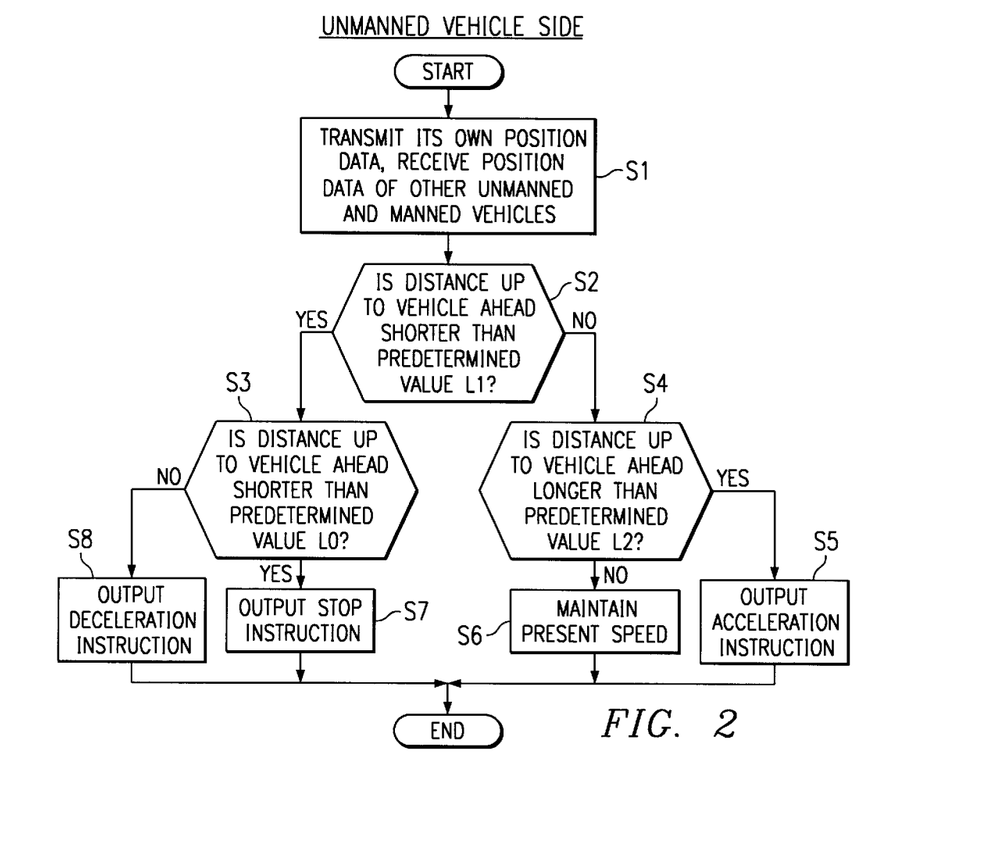
FIG. 2 is a flow chart of processing in an unmanned vehicle side of the first embodiment of the apparatus for fleet control according to the present invention.
Figure 3:
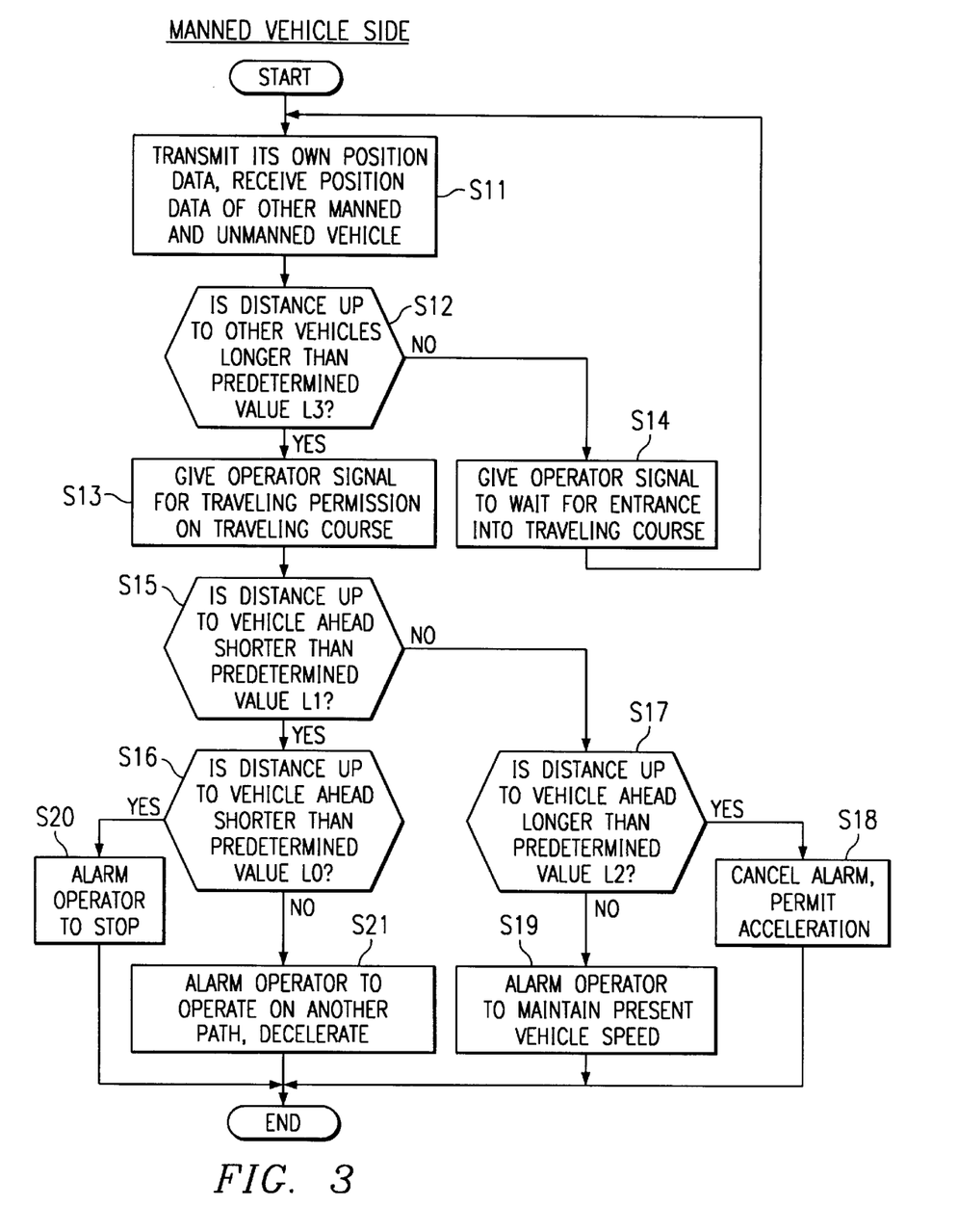
FIG. 3 is a flow chart of processing in a manned vehicle side of the first embodiment of the apparatus for fleet control according to the present invention.

Next, the operation will be explained based on FIGS. 2 and 3. FIGS. 2 and 3 respectively show control processing flow charts of the unmanned vehicle controller 10 and the manned vehicle controller 20. Here, each step number is preceded by S.

First, examples of processing in the unmanned vehicle side will be explained with reference to FIG. 2.

(S1) The present position data of its own is inputted from the unmanned vehicle position detecting means 11, and this position data is transmitted to the other unmanned vehicles and the manned vehicles by means of the unmanned vehicle transmitter/receiver 12. The present position data of the other unmanned vehicles and the manned vehicles on the traveling course are inputted by means of the unmanned vehicle transmitter/receiver 12.

(S2) It is determined whether or not the distance between the unmanned vehicle and the vehicle ahead thereof is shorter than a predetermined value L1. If it is shorter than L1, proceed to S3, and if not, proceed to S4. Here, L1 is the minimum allowable distance between traveling vehicles.

(S3) It is determined whether or not the distance between the unmanned vehicle and the vehicle ahead thereof is shorter than a predetermined value L0 (where L0<L1). If it is shorter than L0, proceed to S7, and if not, proceed to S8. Here, L0 is the distance between the vehicles, for which the unmanned vehicle should be instantly stopped.

(S4) It is determined whether or not the distance between the unmanned vehicle and the vehicle ahead thereof is longer than a predetermined value L2 (where L2>L1). If it is longer than L2, proceed to S5, and if not, proceed to S6. Here, L2 is the minimum allowable distance, for which it is judged that the unmanned vehicle can be accelerated.

(S5) Where a speed instruction value higher than the present speed by a predetermined value $\Delta V$ is outputted to the speed control means 13, the speed is gradually increased in the range lower than the maximum speed prescribed for the traveling course where the unmanned vehicle is traveling at present. Here, $\Delta V$ is a speed up range which is set to achieve a predetermined acceleration. Thereafter, proceed to END, and the processing is completed.

(S6) The present speed instruction is maintained. Proceed to END, and the processing is completed.

(S7) A stop instruction is outputted to the speed control means 13, and the unmanned vehicle is stopped. Thereafter, proceed to END, and the processing is completed.

(S8) Where a speed instruction value which is lower than the present speed is outputted to the speed control means 13, the engine fuel injection quantity, transmission, brake, or the like, is controlled so that the speed becomes equal to the speed instruction value, and the unmanned vehicle is decelerated. Thereafter, proceed to END, and the processing is completed.

The above processing is executed in each predetermined cycle of time, and the distances between the unmanned vehicle and the other unmanned vehicles, and the unmanned vehicle and the manned vehicles are maintained to be greater than a predetermined value L1.

Next, examples of the processing in the manned vehicle side will be explained with reference to FIG. 3.

(S11) The present position data of its own is inputted from the manned vehicle position detecting means 21, and this position data is transmitted to the unmanned vehicles and the other manned vehicles by means of the manned vehicle transmitter/receiver 22. The present position data of the unmanned vehicles and the other manned vehicles on the traveling course are inputted by means of the manned vehicle transmitter/receiver 22.

(S12) It is determined whether or not the distances up to the unmanned vehicles and the other manned vehicles, which are traveling on the traveling course, are longer than a predetermined value L3 (where L3>L2). If it is longer than L3, proceed to S13, and if not, proceed to S14. Here, L3 is the minimum allowable distance between the vehicles, for which the manned vehicle can enter the traveling course.

(S13) An instruction is outputted to the alarm means 23, and a signal for indicating travel permission on the traveling course is given. Then, proceed to S15.

(S14) An instruction is outputted to the alarm means 23, and a signal for indicating wait for the entrance into the traveling course is given. Then, return to S11.

(S15) It is determined whether or not the distance between the manned vehicle and the vehicle ahead thereof is shorter than the predetermined value L1 (similar to the above). If it is shorter than L1, proceed to S16, and if not, proceed to S17.

(S16) It is determined whether or not the distance between the manned vehicle and the vehicle ahead thereof is shorter than the predetermined value L0 (similar to the above). If it is shorter than L0, proceed to S20, and if not, proceed to S21.

(S17) It is determined whether or not the distance between the manned vehicle and the vehicle ahead thereof is longer than the predetermined value L2 (similar to the above). If it is longer than L2, proceed to S18, and if not, proceed to S19.

(S18) An alarm instruction to the alarm means 23 is canceled, and a speed up permission instruction is outputted. Thereby the operator can operate the manned vehicle at a speed which is lower than the maximum speed prescribed for the traveling course where the vehicle is traveling at present. Thereafter, proceed to END, and the processing is completed.

(S19) An alarm instruction is outputted to the alarm means 23, and an alarm is given to the operator to maintain the present vehicle speed. Then, proceed to END, and the processing is completed.

(S20) An alarm instruction is outputted to the alarm means 23, and an alarm is given to the operator to stop the vehicle. The operator instantly stops the vehicle based on the alarm, such as an alarm display, an alarm, or the like, thereby preventing vehicle-to-vehicle contact, or the like, from occurring. Thereafter, proceed to END, and the processing is completed.

(S21) An alarm instruction is outputted to the alarm means 23, and an alarm is given to the operator to avoid the unmanned vehicle. The operator operates the vehicle on another path, or conducts a deceleration operation based on an alarm display, an alarm, or the like, thereby maintaining the distances up to the unmanned vehicles, and up to the other manned vehicles to be longer than the predetermined value L1. Thereafter, proceed to END, and the processing is completed.

The above processing is executed in each predetermined cycle of time, thereby maintaining the distances between the manned vehicle and the unmanned vehicles, and between the manned vehicle and the other manned vehicles.

It should be mentioned that when the vehicle behind the manned vehicle is approaching the manned vehicle may increase the speed to increase the distance between the vehicles. This is enabled by giving an alarm to the operator with the alarm means 23 to increase the speed to avoid the unmanned vehicle when the distance from the vehicle behind the manned vehicle is longer than the predetermined value L0 and shorter than the predetermined value L1.

Figure 4:
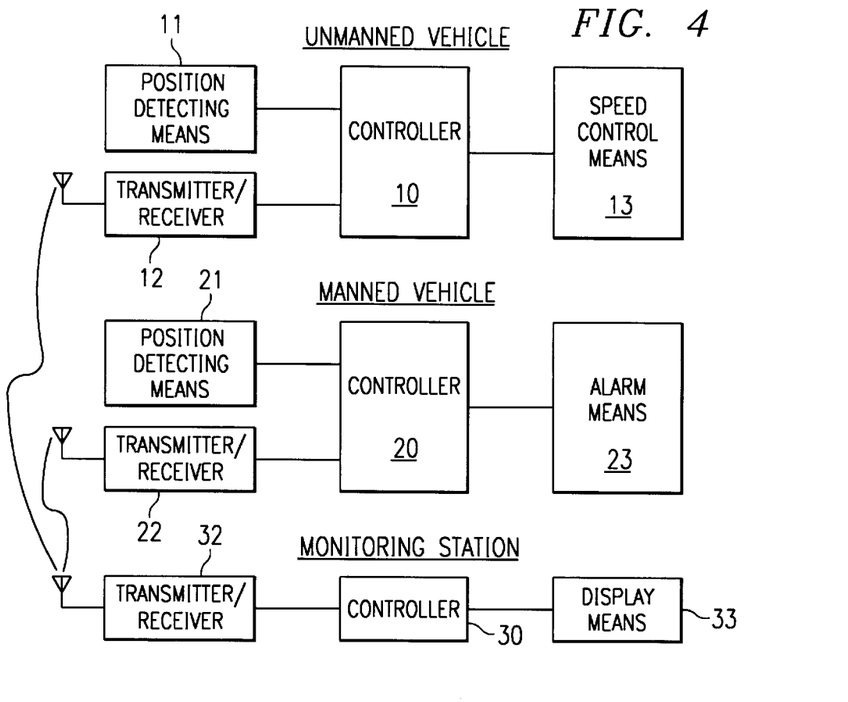
FIG. 4 is a block diagram of the configuration of a second embodiment of the apparatus for fleet control according to the present invention.

Next, a second embodiment will be explained. This embodiment is an example in which a fleet control when unmanned and manned vehicles travel together is conducted by the medium of a monitoring station as is shown in FIG. 4. In FIG. 4, the configurations in the unmanned vehicle side and the manned vehicle side are similar to those in FIG. 1, and the identical numerals and signs are given. The points different from the first embodiment will be described in detail below.

In this embodiment, the unmanned vehicles and the manned vehicles transmit and receive data to and from the monitor station. The unmanned controller 10 inputs its own present position data from the unmanned vehicle position detecting means 11, and transmits the same to the monitoring station by means of the unmanned vehicle transmitter/receiver 12. The manned vehicle controller 20 inputs its own present position data from the manned vehicle position detecting means 21, and transmits the same to the monitoring station by means of the manned vehicle transmitter/receiver 22.

The monitoring station is provided with a monitor controller 30 a monitoring station side transmitter/receiver 32, and a display means 33. The monitor controller 30 is composed of a computer system consisting of a micro computer, or the like, and subjectively conducts fleet control. Specifically, the monitor controller 30 inputs the present position data of each unmanned vehicle, and the present position data of each manned vehicle by means of the monitoring station side transmitter/receiver 32. The monitor controller 30 monitors the distances between the respective unmanned and manned vehicles so that the distances are longer than the predetermined value L1, and transmits an instruction to each vehicle. The monitor controller 30 outputs and displays the positions of each unmanned vehicle and each manned vehicle on the traveling course to and on a display means 33. The display means 33 enables graphic display such as, for example, a CRT display device, a LCD display device, or the like, and graphically displays the position of the traveling course, and the position of each of the unmanned and manned vehicles. The operator of the monitoring station watches the display, and can confirm the positional relationship between each of the unmanned vehicles and each of the manned vehicles on the traveling course.

Figure 5:
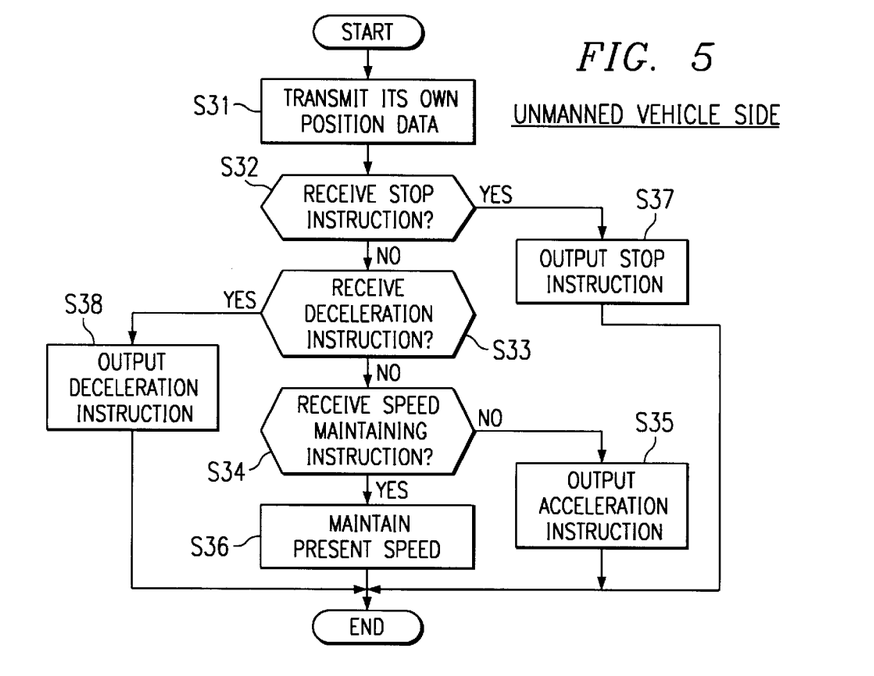
FIG. 5 is a flow chart of processing in an unmanned vehicle side of the second embodiment of a method for fleet control according to the present invention.

Examples of processing in the unmanned vehicle side will be explained below based on FIG. 5.

(S31) The present position data of its own is inputted from the unmanned vehicle position detecting means 11, and this position data is transmitted to the monitoring station by means of the unmanned vehicle transmitter/receiver 12.

(S32) It is determined whether or not a stop instruction is received from the monitoring station by means of the unmanned vehicle transmitter/receiver 12. If the stop instruction is received, proceed to S37, and if not, proceed to S33.

(S33) It is determined whether or not a deceleration instruction is received from the monitoring station by means of the unmanned vehicle transmitter/receiver 12. If the deceleration instruction is received, proceed to S38, and if not, proceed to S34.

(S34) It is determined whether or not a speed maintaining instruction is received from the monitoring station by means of the unmanned vehicle transmitter/receiver 12. If the speed maintaining instruction is received, proceed to S36, and if not, proceed to S35.

(S35) A speed instruction value, which is higher than the present speed by the predetermined value a $\Delta V$ (similar to the above), is outputted to the speed control means 13, and the speed is gradually increased within the range lower than the maximum speed prescribed for the traveling course where the vehicle is traveling at present. Thereafter, proceed to END, and the processing is completed.

(S36) The present speed instruction is maintained. Then proceed to END, and the processing is completed.

(S37) The stop instruction is outputted to the speed control means 13, and the unmanned vehicle is stopped. Thereafter, proceed to END, and the processing is completed.

(S38) A speed instruction value lower than the present speed is outputted to the speed control means 13. Thereby engine fuel injection quantity, brake, or the like, is controlled so that the speed becomes equal to the speed instruction value, and the unmanned vehicle is decelerated. As a result, the distance between the vehicles is maintained to be longer than the predetermined value L1. Thereafter, proceed to END, and the processing is completed.

Figure 6:
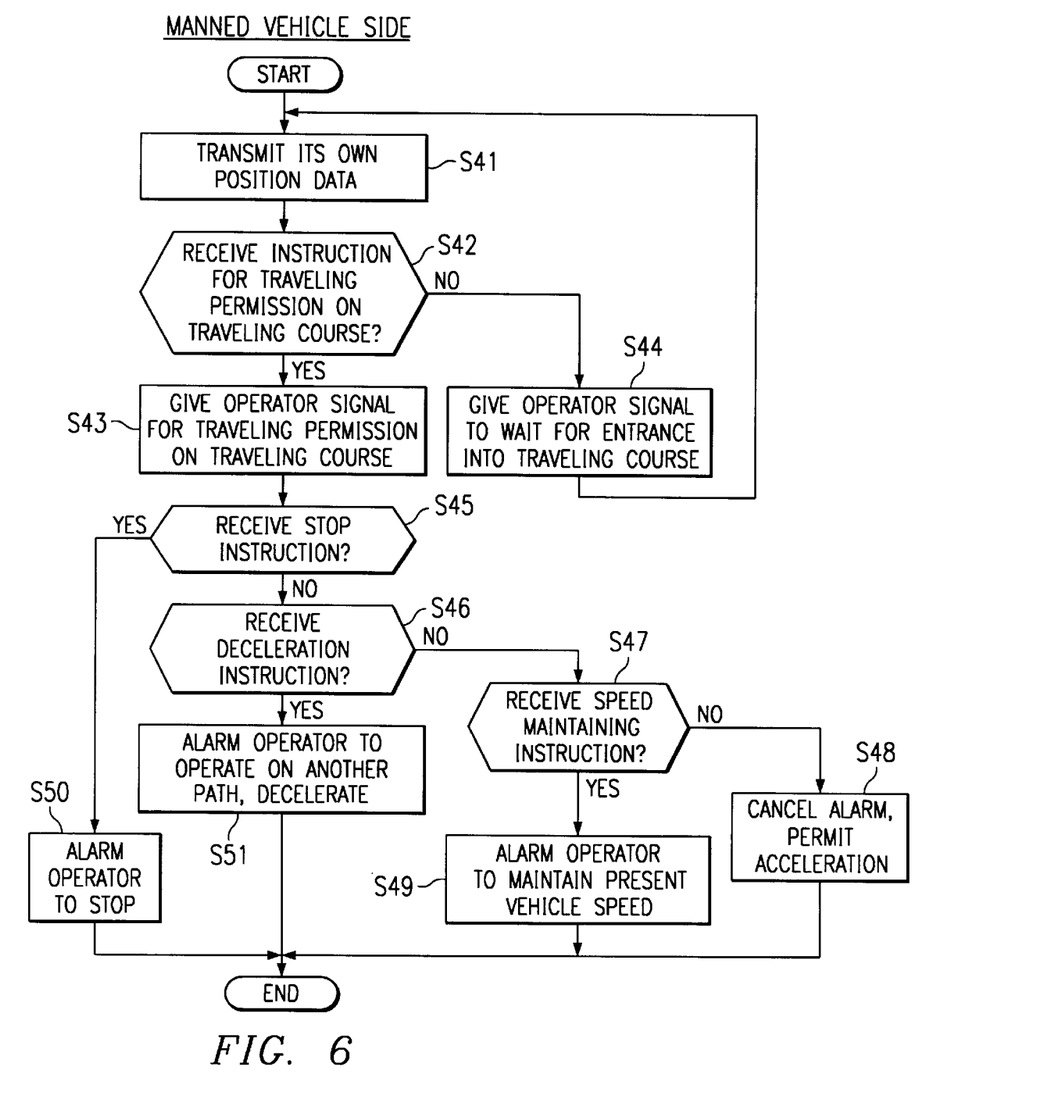
FIG. 6 is a flow chart of processing in a manned vehicle side of the second embodiment of the method for fleet control according to the present invention.

Next, based on FIG. 6, examples of processing in the manned vehicle side will be explained.

(S41) The present position data of its own is inputted from the manned vehicle position detecting means 21, and the position data is transmitted to the monitoring station by means of the manned vehicle transmitter/receiver 22.

(S42) It is determined whether or not an instruction for permission to travel on the traveling course is received from the monitoring station by means of the manned vehicle transmitter/receiver 22. If the travel permission instruction is received, proceed to S43, and if not, proceed to S44.

(S43) An instruction is outputted to the alarm means 23, and a sign for indicating travel permission on the traveling course is given. Then, proceed to S45.

(S44) An instruction is outputted to the alarm means 23, and a sign for indicating wait for the entrance into the traveling course is given. Then, return to S41.

(S45) It is determined whether or not the stop instruction is received from the monitoring station by means of the unmanned vehicle transmitter/receiver 22. If the stop instruction is received, proceed to S50, and if not, proceed to S46.

(S46) It is determined whether or not the deceleration instruction is received form the monitoring station by means of the manned vehicle transmitter/receiver 22. If the deceleration instruction is received, proceed to S51, and if not, proceed to S47.

(S47) It is determined whether or not the speed maintaining instruction is received from the monitoring station by means of the manned vehicle transmitter/receiver 22. If the speed maintaining instruction is received, proceed to S49, and if not, proceed to S48.

(S48) The alarm instruction to the alarm means 23 is canceled, and an acceleration permission instruction is outputted. Thereby, the operator can operate the manned vehicle at a speed within the range lower than the maximum speed prescribed for the traveling course where the vehicle is traveling at present. Thereafter, proceed to END, and the processing is completed.

(S49) The alarm instruction is outputted to the alarm means 23, and an alarm is given to the operator to maintain the present vehicle speed. Then, proceed to END, and the processing is completed.

(S50) The alarm instruction is outputted to the alarm means 23, and gives an alarm to the operator to stop the vehicle. Based on the alarm display, or the alarm, the operator instantly stops the vehicle, thereby preventing vehicle-to-vehicle contact, or the like, from occurring. Thereafter, proceed to END, and the processing is completed.

(S51) The alarm instruction is outputted to the alarm means 23, and gives an alarm to the operator to avoid the unmanned vehicle. Based on the alarm, the operator operates the vehicle on another path, or decelerates, thereby the distances up to the unmanned vehicles and up to the other manned vehicles are maintained to be longer than the predetermined value L1. Thereafter, proceed to END, and the processing is completed.

Figure 7:
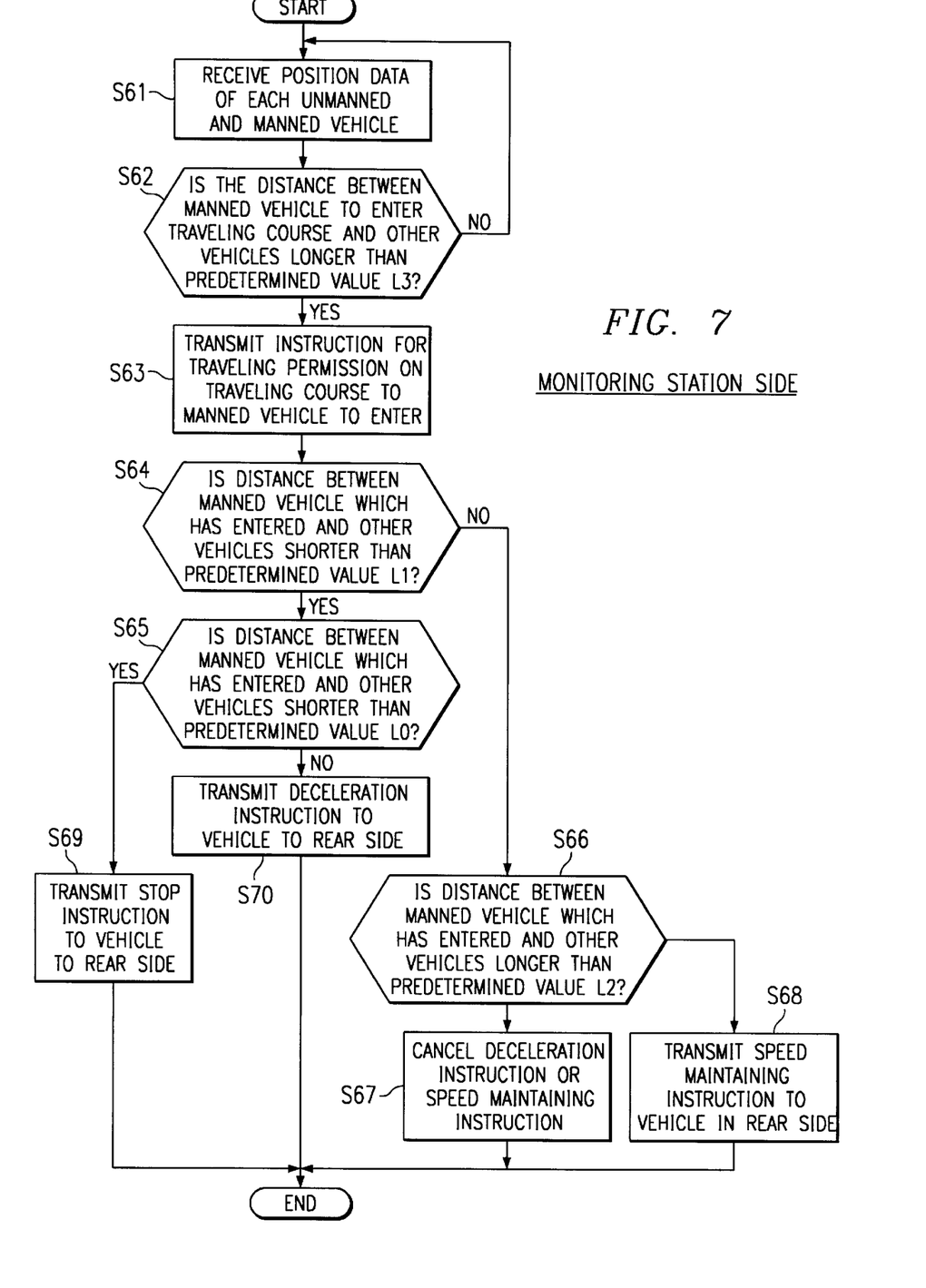
FIG. 7 is a flow chart of processing in a monitoring station side of the second embodiment of the method for fleet control according to the present invention.

Based on FIG. 7, examples of processing in the monitoring station side will be explained.

(S61) The present position data of each of the unmanned and manned vehicles is inputted by means of the monitoring station side transmitter/receiver 32.

(S62) It is determined whether or not the distances between the manned vehicle which is to enter the traveling course, and the unmanned vehicles and the other manned vehicles traveling on the traveling course are longer than the predetermined value L3. If they are longer than L3, proceed to S63, and if not, return to S61. It should be mentioned that in the explanation of FIG. 7 below, the unmanned vehicles and the other manned vehicles traveling on the traveling course are referred to as the other vehicles.

(S63) The instruction for travel permission on the traveling course is transmitted to the manned vehicle which is to enter the traveling course, and proceed to S64.

(S64) It is determined whether or not the distance between the manned vehicle which has entered the traveling course and the other vehicle directly before or directly behind this manned vehicle is shorter than the predetermined value L1. If it is shorter than L1, proceed to S65, and if not, proceed to S66.

(S65) It is determined whether or not the distance between the manned vehicle which has entered the traveling course and the other vehicle directly before or directly behind this manned vehicle is shorter than the predetermined value L0. If it is shorter than L0, proceed to S69, and if not, proceed to S70.

(S66) It is determined whether or not the distance between the manned vehicle which has entered the traveling course and the other vehicle directly before or directly behind this manned vehicle is longer than the predetermined value L2. If it is longer than L2, proceed to S67, and if not, proceed to S68.

(S67) The instruction to cancel the deceleration instruction or to cancel the speed maintaining instruction is outputted to the vehicle to the rear side, which is the manned vehicle which has entered the traveling course, or the other vehicle directly before or directly behind this manned vehicle. Thereby, the vehicle to the rear side can increase the speed within the range lower than the maximum speed prescribed for the traveling course. Thereafter, proceed to END, and the processing is completed.

(S68) The speed maintaining instruction is transmitted to the vehicle to the rear side. Then, proceed to END, and the processing is completed.

(S69) The stop instruction is transmitted to the vehicle to the rear side, and the vehicle to the rear side is stopped. Thereafter, proceed to END, and the processing is completed.

(S70) The deceleration instruction is transmitted to the vehicle to the rear side. Thereby, the distance between the manned vehicle which has entered the traveling course and the vehicle to the rear side is maintained to be longer than the predetermined value L1. Thereafter, proceed to END, and the processing is completed.

As in the aforesaid second embodiment, the unmanned vehicle controller 10, the manned vehicle controller 20, and the monitor controller 30 execute the respective processing in each predetermined cycle of time, thereby maintaining the distance between the unmanned vehicles and the manned vehicles to be longer than the predetermined value L1. As in the above, fleet control can be carried out by monitoring the positional interrelationship between the unmanned and manned vehicles on the traveling course in the monitoring station side, thereby enabling the effective operation of the unmanned vehicle system.

It should be mentioned that when the vehicle behind the manned vehicle is approaching it, the manned vehicle may increase the speed to increase the distance between the vehicles as described in the above. In this case, in the processing of the monitoring station, in the aforesaid S70, an alarm instruction may be transmitted to the manned vehicle to speed up to avoid the unmanned vehicle when the distance between the manned vehicle and the unmanned vehicle behind the manned vehicle is in the range from the predetermined value L0 to the predetermined value L1. In the manned vehicle, it is determined whether the acceleration instruction is received from the monitoring station, and if it is received, an alarm can be given to the operator to accelerate to avoid the unmanned vehicle by means of the alarm means 23.

INDUSTRIAL AVAILABILITY

The present invention is useful as an apparatus and a method for fleet control when unmanned and manned vehicles travel together, by which mutual interference is prevented when the manned vehicles simultaneously travel with the unmanned vehicles on the same traveling course.

I claim:

1. An apparatus for controlling unmanned and manned vehicles traveling together on a same traveling course comprising:

an unmanned vehicle position detector for detecting a position of said unmanned vehicle;

an unmanned vehicle transmitter/receiver for transmitting and receiving data to and from a manned vehicle;

an unmanned vehicle controller for transmitting the detected position of the unmanned vehicle by said unmanned vehicle transmitter/receiver;

a manned vehicle position detector for detecting a position of said manned vehicle;

a manned vehicle transmitter/receiver for transmitting and receiving data to and from said unmanned vehicle;

a manned vehicle controller for inputting the detected position of the manned vehicle; and an alarm device for providing an alarm to an operator of said manned vehicle;

wherein said manned vehicle controller compares the unmanned vehicle position with the manned vehicle position and, when said unmanned vehicle travels ahead of said manned vehicle, outputs an alarm signal to said alarm device for avoiding said unmanned vehicle based on a distance between said manned vehicle and said unmanned vehicle.

2. An apparatus for controlling unmanned and manned vehicles traveling together in accordance with claim 1, wherein said alarm device provides said alarm to the operator by using at least one of an indicator lamp, a prompting message display on a character display device, a graphic display and an audible alarm.

3. An apparatus in accordance with claim 1, wherein said manned vehicle controller outputs said alarm signal to said alarm device when the distance between said manned vehicle and said unmanned vehicle is shorter than a predetermined value.

4. An apparatus for controlling unmanned and manned vehicles traveling together on a same traveling course comprising:

a manned vehicle position detector for detecting a position of the manned vehicle;

a manned vehicle transmitter/receiver for transmitting and receiving data to and from said manned vehicle;

a manned vehicle controller for transmitting the detected manned vehicle position;

an unmanned vehicle position detector for detecting a position of said unmanned vehicle;

an unmanned vehicle transmitter/receiver for transmitting and receiving data to and from said manned vehicle;

an unmanned vehicle controller for inputting the detected unmanned vehicle position; and a speed controller for conducting speed control of said unmanned vehicle;

wherein said unmanned vehicle controller compares the manned vehicle position with the unmanned vehicle position, and, when said unmanned vehicle travels ahead of said manned vehicle, outputs an executive instruction to said speed controller based on a distance between said unmanned vehicle and said manned vehicle.

5. An apparatus for controlling unmanned and manned vehicles traveling together in accordance with claim 4, wherein said speed controller conducts speed control of said unmanned vehicle by conducting at least one of engine fuel injection quantity control, transmission control, and brake control.

6. An apparatus in accordance with claim 4, wherein said unmanned vehicle controller outputs said executive instruction to said speed controller the distance between said unmanned vehicle and said manned vehicle is shorter than a predetermined value.

7. An apparatus for controlling unmanned and manned vehicles traveling together on a same traveling course comprising:

a monitoring station;

a manned vehicle position detector for detecting a position of said manned vehicle;

a manned vehicle transmitter/receiver for transmitting and receiving data and instructions to and from said monitoring station;

a manned vehicle controller for transmitting the detected position of the manned vehicle and for receiving alarm instructions from said monitoring station by means of said manned vehicle transmitter/receiver;

an alarm device for providing an alarm to an operator based on the alarm instruction received by said manned vehicle controller;

an unmanned vehicle position detector for detecting a position of an unmanned vehicle;

an unmanned vehicle transmitter/receiver for transmitting and receiving data instructions to and from said monitoring station;

an unmanned vehicle controller for transmitting the detected position of the unmanned vehicle and for outputting a speed control instruction; and a speed controller for conducting speed control of said unmanned vehicle;

wherein said monitoring station includes a monitoring station transmitter/receiver for transmitting and receiving data and instructions to and from said manned and unmanned vehicles, and a monitor controller, said monitor controller for comparing the position of said manned vehicle and the position of said unmanned vehicle and, when said unmanned vehicle travels ahead of said manned vehicle, for transmitting an alarm instruction to avoid said unmanned vehicle to said manned vehicle based on a distance between said manned vehicle and said unmanned vehicle.

8. An apparatus for controlling unmanned and manned vehicles traveling together in accordance with claim 7, wherein said unmanned vehicle controller outputs said speed control instruction based on a deceleration instruction from said monitoring station.

9. An apparatus for controlling unmanned and manned vehicles traveling together in accordance with claim 7, wherein said speed controller conducts speed control by conducting at least one of engine fuel injection quantity control, transmission control, and brake control.

10. An apparatus for controlling unmanned and manned vehicles traveling together in accordance with claim 7, wherein said monitor controller further transmits a speed control instruction to said unmanned vehicle when said manned vehicle travels ahead of said unmanned vehicle and the distance between both vehicles is shorter than a predetermined value.

11. An apparatus for controlling unmanned and manned vehicles traveling together in accordance with claim 7, wherein said monitor controller further provides an alarm instruction to said manned vehicle to avoid said unmanned vehicle when said manned vehicle travels ahead of said unmanned vehicle and the distance between both vehicles is shorter than a predetermined value.

12. An apparatus for controlling unmanned and manned vehicles traveling together in accordance with claim 7, wherein said monitor controller includes a display for graphically displaying the position of the traveling course and the position of the unmanned vehicle and manned vehicle.

13. An apparatus in accordance with claim 7, wherein said monitor controller transmits said alarm instruction to said manned vehicle when the distance between said manned vehicle and said unmanned vehicle is shorter than a predetermined value.

14. A method for controlling manned and unmanned vehicles traveling together on the same traveling course comprising the steps of:

comparing the position of said unmanned vehicle with the position of said manned vehicle;

providing an alarm for avoiding said unmanned vehicle to an operator of said manned vehicle when said unmanned vehicle travels ahead of said manned vehicle based on a distance between said manned vehicle and said unmanned vehicle.

15. A method for controlling manned and unmanned vehicles traveling together on the same traveling course in accordance with claim 14, further comprising the step of conducting speed control of said unmanned vehicle when said manned vehicle travels ahead of said unmanned vehicle.

16. A method for controlling manned and unmanned vehicles traveling together on the same traveling course in accordance with claim 15, wherein said step of conducting speed control is conducted by at least one of engine fuel injection quantity control, transmission control, and brake control.

17. A method for controlling manned and unmanned vehicles traveling together on the same traveling course in accordance with claim 14, further comprising the step of providing an alarm for avoiding said unmanned vehicle to the operator of said manned vehicle when said manned vehicle travels ahead of said unmanned vehicle.

18. A method for controlling manned and unmanned vehicles in accordance with claim 14, wherein said step of providing an alarm includes providing an alarm when the distance between said manned vehicle and said unmanned vehicle is shorter than a predetermined value.

* * * * *